United States Patent [19]

Gunckel, II et al.

[11] 4,199,810

[45] Apr. 22, 1980

[54] RADIATION HARDENED REGISTER FILE

[75] Inventors: Thomas L. Gunckel, II, Santa Ana; John S. Irvine, Fountain Valley, both of Calif.

[73] Assignee: Rockwell International Corporation, El Segundo, Calif.

[21] Appl. No.: 757,807

[22] Filed: Jan. 7, 1977

[51] Int. Cl.² .............................................. G06F 13/00
[52] U.S. Cl. ...................................... 364/200; 371/68
[58] Field of Search ............................. 235/153 AE; 364/200 MS File, 900 MS File

[56] References Cited

U.S. PATENT DOCUMENTS

| 3,562,716 | 2/1971 | Fontaine | 235/153 AK |
| 3,812,468 | 5/1974 | Wollum et al. | 235/153 AE |
| 3,934,227 | 1/1976 | Worst | 364/200 |
| 3,950,729 | 4/1976 | Fletcher et al. | 364/200 |
| 4,031,374 | 6/1977 | Groudan et al. | 235/153 AE |

*Primary Examiner*—Howard A. Birmiel
*Attorney, Agent, or Firm*—H. Fredrick Hamann; Leonard Tachner

[57] ABSTRACT

A radiation hardened register file renders a central processing unit intrinsically hard to the disruptive effects of nuclear radiation by providing means for establishing a valid rollback point for each computer instruction operation performed in the central processing unit. Dual data register images provide alternate locations for storing data operands in the register file. A pointer register stores a signal the truth state of which indicates which of the two images currently provides the proper place to store information presently being written and also provides an indication of the current location of assured valid signals for a recovery operation and resumption of normal computer functions subsequent to a disruptive event. Pointer save registers are used to store the latest value of the signal stored in the pointer registers, thereby also preserving valid pointer information for recovery subsequent to a circumvented disrupting event. A master pointer register stores a signal indicating which of two alternate pointer save registers currently stores the appropriate signal for selecting the proper truth state for the signal in the pointer register.

21 Claims, 20 Drawing Figures

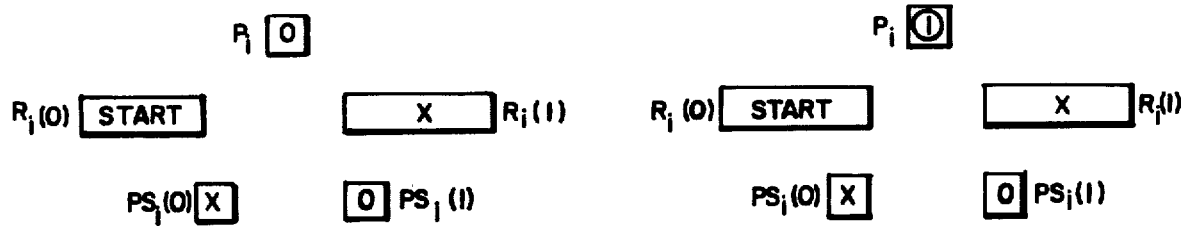
NORMAL OPERATION
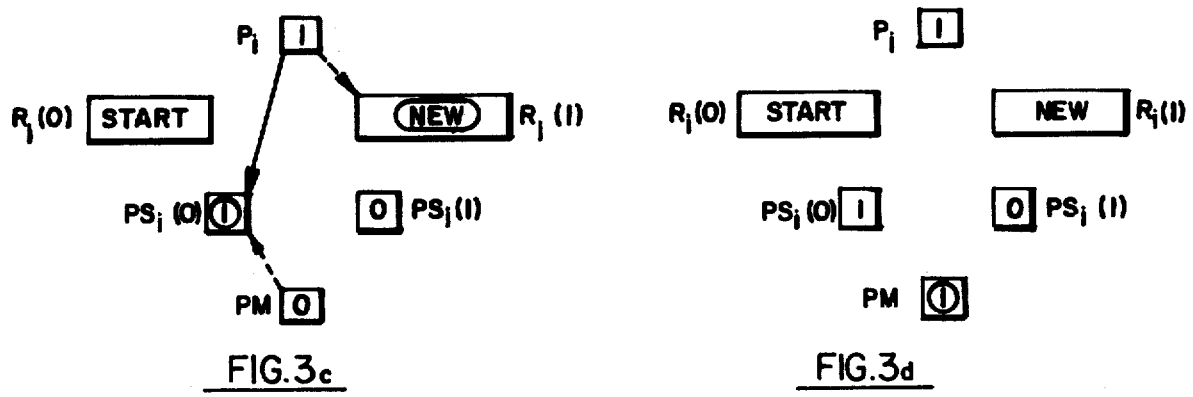
NORMAL OPERATION

RECOVERY OPERATION

RECOVERY OPERATION

RADIATION HARDENED REGISTER FILE

The invention herein described was made in the course of or under a contract or subcontract thereunder with the Air Force.

BACKGROUND OF THE INVENTION

1. Field of the Invention

The present invention relates generally to digital computers that are resistant to otherwise disrupting events such as the occurrence of nuclear radiation. More specifically, the present invention relates to an appartus for circumventing the effects of such a disrupting event without increasing the cost of software associated with operation of the computer and without affecting the data throughput performance of the computer.

2. Prior Art

There are numerous apparatus and techniques known in the art which provide means for circumventing the detrimental effects of a disrupting event, such as nuclear radiation, on the operation of a digital computer. Irrespective of the circumvention technique utilized, the circumvention mode enables a digital computer to resume normal operations after being interrupted temporarily by a set of environmental conditions which exceed the design operating limits of the computer circuits. Hence, circumvention techniques permit circumvention of potentially hazardous conditions by means of an interruption and a following resumption of the normal computer modes of operation. Ordinarily such an interruption is initiated by a signal from a detector that is sensitive to the particular environmental conditions to be circumvented. The action taking place in the computer during the interrupt state is simply a wait operation which lasts until the adverse operating conditions produced by the hostile environment no longer exist. A recovery mode is then initiated to return the computer to a normal mode of operation. The functions performed during the interrupt state are controlled by signals from such a detector, while the functions performed during the recovery mode are controlled predominantly by software using data read from a computer's memory unit. During the recovery mode, a legitimate or valid starting point or roll-back point previously established is utilized in the recovery process by the computer.

It is generally well known that memory devices used in a computer capable of circumventing a hostile environment such as nuclear radiation must be capable of inhibiting extraneous signals that might otherwise cause stored data to be altered. These extraneous signals must be inhibited from affecting the contents of memory cells even if the normal reading and writing circuits exhibit faulty behavior due to environmental stress. However, while it is a requirement to prevent damage to static stored data, present component technology does not encompass a memory device which can be used to prevent the loss of data being written at the time of the environmental interference.

It is also well known that to permit circumvention of such environmental interference, at least one valid starting point must exist at all times during the normal operation of the object program. This valid starting point is a requirement which enables the recovery routine, subsequent to the interference, to conduct a return to the object program and thereafter maintain the functional integrity of the computer system. Unfortunately, the inability in present technology to prevent the loss of data being written at the time of the interference makes it difficult to establish a valid starting point without substantially and adversely affecting the hardware costs or the software costs or the performance or some combination of these factors of a computer capable of such circumvention. As used herein, the "interference" and the "circumvention" thereof are substantially concurrent, cause and effect related events.

One common method of circumventing interference events is by way of a software circumvention program. A software circumvention approach also defines roll-back points. In a circumvention, the program returns to the latest roll-back point and restarts computer operation from that point, subsequent to the interference. The manner in which software circumvention is implemented can be illustrated by the simple update equation: $A = A + X$. In a conventional machine this could be coded as:

load A
add X
store A.

If interference occurs on the last statement (store A) the variable A can be scrambled, in which case all record of A is lost and the system cannot recover. A circumvention "hard" program for the above examples becomes:

load A
add X
store B
PTS
load B
store A where PTS (Program Triple Store) establishes a roll-back point.

The instruction, Program Triple Store, (PTS), refers to a special instruction that results in the storing of the program count, the contents of a status register and the contents of an index register, in identical form in three distinct memory locations in the main memory unit. Writing such information sequentially into three separate locations in the memory unit, in identical form, permits recovery subsequent to circumvention of a disrupting event by means of an algorithm. Such an algorithm results in comparisons of the contents of one location with the contents of the other two, until it becomes evident from such comparisons which one or more of the three special storage locations contains assured valid contents. Valid contents refer to valid program count status register contents and index register contents which could not have been affected by the disrupting event and which provide a means for recovery to resume normal operations subsequent to such an event.

If the circumvention occurs on the store B statement, the program just recomputes B. If the circumvention occurs on the store A statement, the program recovers the value to be stored in A from location B. One problem with the software approach of circumvention is the difficulty of ascertaining that the final code is in fact "hard". It is desirable to limit the number of PTS statements because they represent overhead in execution time and memory. However, limiting the number of roll-back points opens the program to numerous subtle failure modes involving branches to subroutines, interrupts, and multiple circumvention.

In practice, software program circumvention involves coding the basic program, making the code "hard" by the addition of roll-back points, and then optimizing the code to minimize the overhead for roll-back points. When all this is done it is then usually necessary to verify that the program is "hard". Such verification ordinarily requires a large amount of manual intervention for test definition and evaluation.

There is also a throughput penalty associated with the use of PTS instructions beyond the direct penalty resulting from the use of the added PTS instructions. For example, from the above latter sequence of instructions it is seen that the store B and load B instructions are overhead since they do not appear in the original code. Accordingly, the software technique for establishing a roll-back point by means of Program Triple Store increases software costs while decreasing data throughput performance.

Another possible software technique for establishing rollback points is the use of Image Store Instructions (IMAST). An IMAST instruction copies the contents of the register file of the central processing unit and one other word containing the program counter and status bits in alternate storage blocks in the main memory unit in conjunction with a hard pointer PTR.

When an IMAST instruction is executed, the central processing unit image (contents of file registers, program counter and status register) is written into the block indicated by the hard pointer PTR. When all the contents of the file registers, program counter and status register are written sequentially into one of the two blocks, the hardened pointer PTR is changed to point to the other block storage location. Recovery is accomplished subsequent to an environmental interference by loading the registers of the central processing unit, CPU, from the block not pointed to by the pointer PTR.

If circumvention takes place while the computer is responding to an IMAST instruction by storing its CPU image into image B, then the recovery routine uses image A to restore the CPU registers. If circumvention occurs while the pointer PTR is being changed, then the status of the pointer PTR will be indeterminate. However, it would make no difference whether the pointer PTR points to image A or to image B since both image blocks would contain a consistent image and would, thus, lead the central processing unit, CPU, and computer to a successful recovery.

The IMAST technique for establishing roll-back points also requires a programmer to insert a special instruction to create each roll-back point.

SUMMARY OF THE INVENTION

The invention disclosed herein relates to a unique hard register file which provides an apparatus for implementing a computer that is intrinsically hard to radiation by precluding the loss of information in the central processing unit and in the memory unit. The invention also provides an apparatus for implementing a circumvention technique without increasing software costs and with only a nominal impact on hardware costs. The radiation hardened register file of this invention results in an intrinsically hard central processing unit by establishing a new roll-back point of valid signals upon execution of each computer instruction. The hard register file has two locations for storing all key variables in the central processing unit. Each of these locations includes a set of radiation hard memory storage elements which will not be upset during a radiation event. One set of storage elements is used to store a roll-back point. A pointer indicates which set to use for the roll-back point. Since a new roll-back point is established for each instruction, after a circumvention, the central processing unit uses the appropriate set of storage locations to reset the state of computer operations that existed just prior to the circumvention. If a memory-write operation was underway when the circumvention occurred, which might otherwise result in a scrambled memory word, the central processing unit repeats the write instruction and the word is rewritten into the memory unit thereby eliminating the possibility of scrambled data.

DESCRIPTION OF THE DRAWINGS

FIGS. 3a-3d, are block diagrams which illustrate the manner in which roll-back points are established in this invention.

DESCRIPTION OF THE INVENTION

Figure 1:
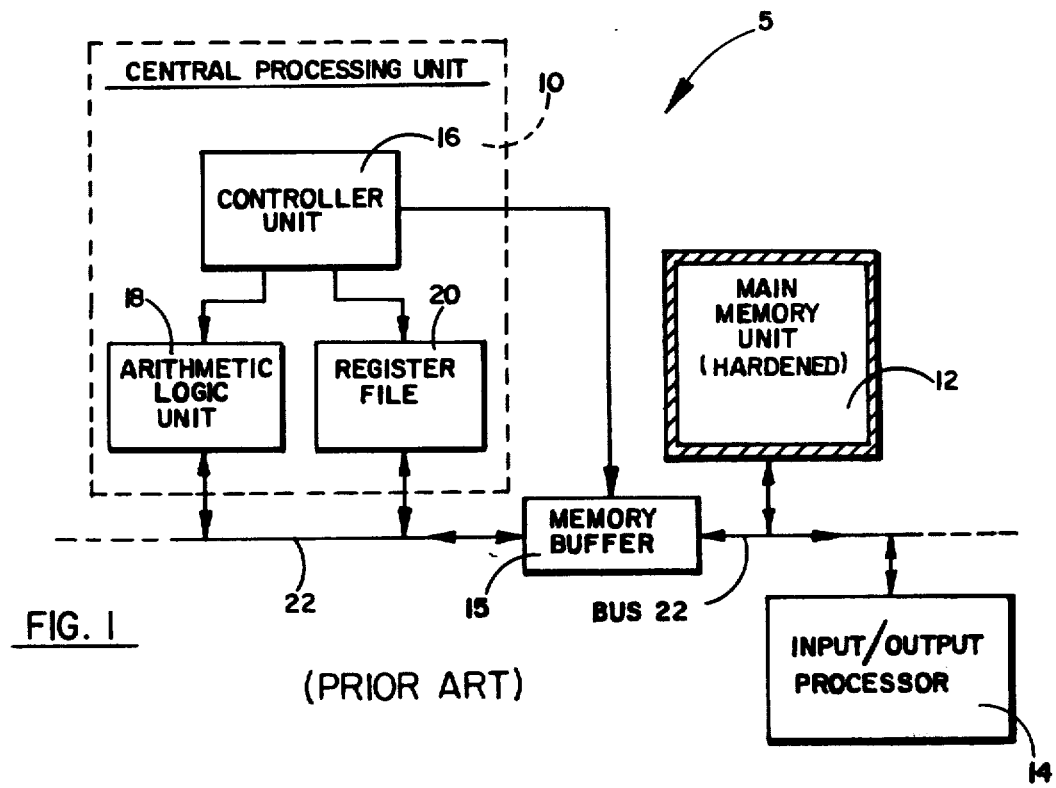
FIG. 1 is a simplified block diagram of a typical computer and central processing unit architecture including a hardened memory unit.

Referring now to FIG. 1, there is shown a block diagram of a typical computer system 5 including typical central processing unit 10, main memory unit 12, input/output processor 14, and memory buffer 15. Central processing unit 10 comprises controller unit 16, arithmetic logic unit 18 and register file 20. Signal bus 22 provides means for signal transfer between the various units of the computer.

Typically, main memory unit 12 includes a large number of memory cells many of which may be allocated for the purpose of storing the operating program. An operating program is a set of instructions which when followed in what is commonly called a program routine, results in the appropriate computer operations for the intended purpose, such as, but not limited to, performing navigation and guidance calculations and control of navigation and guidance systems in accordance therewith. While these are expected uses in the context of an embodiment of this invention, other uses, such as business applications, are also contemplated for a computer in which the present invention may be employed.

Typically, controller unit 16 responds to a control console (not shown) or to programmed instructions fetched from the main memory unit 12 to control operations in the central processing unit 10 and to communicate with main memory unit 12. One such communication may be to fetch additional instructions in a pre-established order as dictated by the program stored in the main memory unit 12. The central processing unit may then perform operations on data also fetched from the main memory unit 12 in accordance with the previously fetched programmed instructions.

In some computers, the initially fetched instruction is applied to a firmware programmed device, such as a read-only memory, ROM (not shown). The fetched instruction acts as a macroinstruction from which numerous microinstructions are generated in accordance with the previously programmed contents of the firmware programmed device. These microinstructions may then be applied to other portions of the central processing unit and the computer, in general, to control computer operations. Typically, a memory buffer 15 is used for communication with main memory unit 12. Memory buffer 15 contains the decoders and drivers which are used to decode and transfer signals to main memory unit 12 in a format recognizable thereby.

Data signals that may be stored in an additional portion of main memory unit 12 and fetched under the control of controller unit 16 are temporarily stored in register file 20. Register file 20 typically contains a number of registers, such as 16, each usually having a capacity of one word. One word may have 8, 16, or 32 bits or any other number of bits, depending upon the computer involved. The registers in register file 20 are used to store such words, also commonly called operands, that is, words to be operated upon by other portions of central processing unit 10. More specifically, such operands are transferred to arithmetic logic unit 18 which acts upon stored operands in accordance with arithmetic and logic equations under the control of controller unit 16. The result of an arithmetic or logic operation performed in arithmetic logic unit 18 may then be stored in a designated register in register file 20. The result of the arithmetic or logic operation may then be used as an operand in a subsequent arithmetic or logic operation or it may be restored to main memory unit 12 depending upon the instructions contained in the program under which the computer is operated.

As is well known in the computer art, a typical computer is often used in conjunction with input/output peripheral devices which enter operating programs into the computer's main memory unit and which provide external stimuli to which the computer may respond in accordance with a stored program. Other input/output peripheral devices include devices for monitoring computer operations. And still other peripheral units may provide capabilities for generating input signals and for receiving output signals.

Typically, a computer includes an input/output processor, such as input/output processor 14, which controls the interface between the computer and the input/output peripheral devices to which the computer is connected.

From the above discussion, it will be observed that a computer's main memory unit which ordinarily stores signals that represent an operating program or signals upon which the computer operates in accordance with the stored program, is a key element in computer architecture insofar as circumvention of a disrupting environment is concerned.

By way of example, if, as shown in FIG. 1, main memory unit 12 of a typical computer is hardened, that is, made resistant to a disrupting event which would otherwise cause some random upset of some or all of the signals stored in the memory cells of the main memory unit, it is possible for the computer to circumvent or wait out the disrupting event and then resume normal operations utilizing instruction signals and data signals that were preserved and not permanently affected by the disrupting event. However, such a conclusion presupposes that all the signals that a computer requires to resume normal operation have been preserved within the hardened memory unit during the interfering event. Ordinarily this is not the case, because even if all the other components associated with the computer operation were also hardened, signals being transferred between the major elements of the computer, even those being written into the main memory unit at the time of the disrupting event, cannot be protected with the presently known technology.

By way of example, signals that are stored in register file 20 of central processing unit 10 or that are being operated upon by arithmetic logic unit 18 at the time of the occurrence of the disrupting event are ordinarily not protected from the interference effects of such a disrupting event and are, therefore, probably erroneous after the event has ended. Accordingly, even if main memory unit 12 is a hardened device, information in the form of data signals in the central processing unit or in memory buffer 15 may be lost during a disrupting event.

One way of overcoming this problem is to provide means by which information in the form of signals that may be in transit or in some other way in an unhardened environment, (also called a "soft" environment), during the occurrence of a disrupting event, are also stored in a hardened portion of the computer, such as hardened main memory unit 12.

Environmental disruption circumvention techniques that employ special memory cell locations in the hardened main memory unit to overcome this transient signal problem, are commonly referred to as "software circumvention techniques". Two such software techniques previously mentioned include the Program Triple Store Technique and the Image Store Instruction Technique. These two software circumvention techniques and the circumvention technique employed by means of the invention disclosed herein have one thing in common; namely, the creation of roll-back points. A rollback point is defined herein as a set of signals of assured validity to which the computer may rollback subsequent to the disrupting event to resume normal operations.

The key variables in the central processing unit that ordinarily must be stored in a hardened condition in order to provide valid roll-back data are the signal contents in register file 20, which ordinarily includes the various operands previously mentioned, a program count word which, by the count it represents, indicates where the computer was in the sequence of programmed instructions at the time of the event, and a number of status flags which indicate the status of some operating conditions in the computer.

Figure 2:
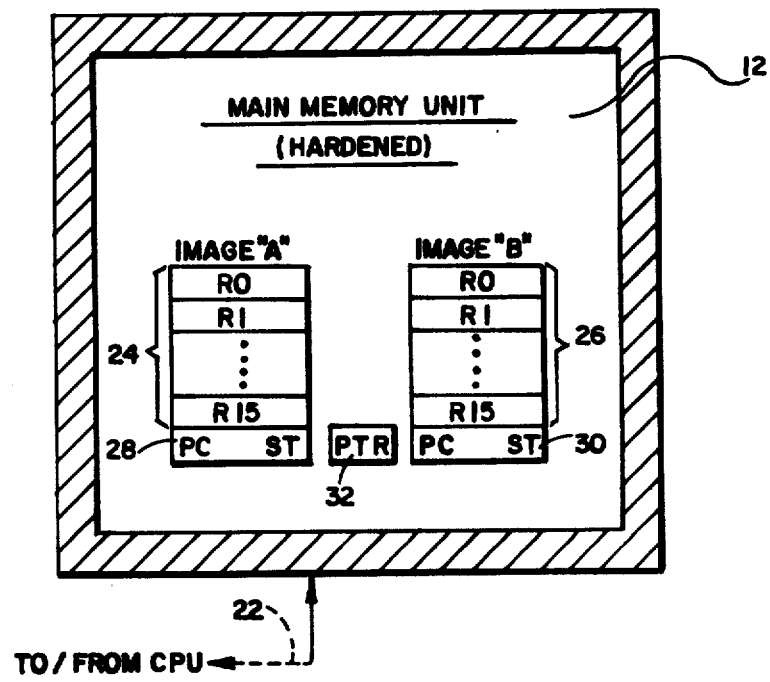
FIG. 2 is a more detailed illustration of the contents of a hardened memory unit for use in a prior art circumvention technique.

The image store software circumvention technique employs alternate storage blocks in hardened main memory unit 12 as represented by FIG. 2. Periodically, the contents of register file 20 of central processing unit 10 are transferred to the portion of main memory unit 12 set aside for the software circumvention technique. Typically, the main memory unit will have a portion which may be labelled image A and a portion which may be labelled image B. Image A, by way of example, might contain storage elements forming 16 registers which collectively correspond to portion 24 of image A. Image A would also have a set of storage elements 28 which are used for the combined purposes of storing the program count word and storing the various signal representing the status information. Image B provides duplicate storage elements 26 and 30 for storing the same types of information. Memory cell 32 is utilized as a pointer, PTR, to indicate which of the two images is to be used for writing the current image of the signals in the central processing unit. Of course, it will be recognized that if a circumvention event occurs while either image is being written into, the recovery sequence subsequent to the circumvention event utilizes the image not pointed to by pointer 32 as the source of assured valid signal; that is, a valid roll-back point.

The IMAST technique for establishing roll-back points, like other software circumvention techniques, requires that the programmer insert a special instruction to create each roll-back point to transfer the signals comprising each image to main memory unit 12 and to store them in the appropriate image location. Accordingly, there is a substantial impact on software costs and on computer performance in the form of decreased throughput.

This invention obviates the requirement for storing register file images, that is, copies of the contents of the register file in hardened main memory unit 12, by employing hardened register file 20 that utilizes duplicate sets of hardened storage elements for establishing roll-back points for all the signals written into the register file.

The method of establishing roll-back points and the method of utilizing roll-back points for purposes of recovery employed in this invention are best illustrated by FIGS. 3a–3d and 4a–4d. Throughout the following discussion, it should be remembered that a device hardened to protect its signal contents from the effects of a disruptive environmental condition cannot, under the present technology, provide such protection of signals that are in transit, that is, signals in the process of being written into such hardened storage elements. Consequently, a disruptive event that takes place while such writing is being conducted, makes the contents of such storage elements unreliable. Thus, there is no assurance that the signals in the process of being written were not affected in some indeterminate way by the disruptive event.

In each of FIGS. 3a–3d and 4a–4d, only the portion of the hard register file which is concerned with one register is shown and "x" denotes a "don't care" signal, that is, a signal whose truth state is not necessarily relevant to the action taking place. A circled value denotes that a change has been made in the contents of that register during that stage. The term $R_i(0)$ denotes the "0" image register of the $R_i$ register, and $R_1(1)$ denotes the "1" image register of the $R_i$ register. A set of data signals comprising a word to be written into the $R_i$ register is written into either the register as $R_i(0)$ or the register as $R_i(1)$ depending on the truth state of the signal stored in the pointer $P_i$. Pointer save registers $PS_1(0)$ and $PS_i(1)$ are each one bit registers that are used either during rollback point establishment to store the current truth state of the pointer $P_i$ or during recovery to control the truth state of the pointer $P_i$ to take on a value corresponding to the contents of the pointer save register. The pointer save register selected for either reading the value corresponding to the signal stored in $P_i$ or for forcing that signal to a corresponding value, depends upon the truth state of the signal stored in an additional register called the master pointer PM. The hard register file contains one of each of registers $P_i$, $R_i(0)$, $R_i(1)$, $PS_i(0)$, and $PS_i(1)$ for each word to be stored in the file register. In one embodiment, i takes on values in the range 0, . . . 15. On the other hand, there is usually only one master pointer PM for the entire hard register file.

The functional operation of the hard register file for the purpose of establishing roll-back points proceeds as follows:

1. Pointer $P_i$ is complemented by logically inverting its contents.

2. When a register is to be altered (typically at the end of the instruction execution), the new value is written into either image "0" or image "1" depending upon the value of the signal stored in the pointer $P_i$.

3. The signal stored in pointer $P_i$ is copied into either pointer save register $PS_i(0)$ or $PS_i(1)$ depending upon the value of the signal stored in the master pointer PM.

4. The master pointer PM is then complemented.

This action is performed for each instruction executed, thus, each instruction establishes a roll-back point.

FIGS. 3a–3d represents the above sequence of events by illustrating the sequential changes, each such change in the sequence being represented by FIGS. 3a, 3b, 3c and 3d, respectively.

FIG. 3a represents an initial condition in which the word "START" has already been written into image "0" of register $R_i$, in accordance with the truth state 0 of the pointer $P_i$. The contents of the pointer $P_i$ have already been copied into the pointer save register $PS_i(1)$, the pointer save register $PS_i(1)$ having been selected in accordance with the prior truth state of the master pointer signal. Furthermore, in FIG. 3a, the master pointer PM has already been complemented so that it now stores a signal having a truth state 0. As previously indicated, the first step in the sequence of circumvention operations in the hard register file is the complementing of the pointer $P_i$. this complementing is represented in FIG. 3b in which the signal content of $P_i$ is shown to have changed from 0 to 1. The occurrence of a change is shown by the circle around the 1. All the other register contents have remained the same while $P_i$ has been complemented.

On the next operation within the circumvention cycle for establishing roll-back points, a new word is to be written into register $R_i$. As shown in FIG. 3c, this new word is written into the "1" image of register $R_i$, namely, $R_i(1)$. Accordingly, the word "NEW" is entered into the $R_i(1)$ register and the fact that this change was made during the current stage of the roll-back point establishment process (or circumvention process) is represented by the circle around the word NEW. The word NEW is written into the "1" image of register $R_i$ because the signal stored in pointer $P_i$ is a 1. Figure 3c also indicates that the value of the signal in pointer $P_i$, has been written into pointer save register $PS_i(0)$. Accordingly, the content of the register $PS_i(0)$ is shown to be a 1 changed during the current stage as represented by the circle around the 1.

In FIGS. 3 and 4, dotted line arrows indicate a selection in accordance with the truth state of a stored signal and solid line arrows indicate a truth state signal change of the contents in accordance with the truth state of a stored signal.

As shown by the dotted arrow between the master pointer PM and the pointer save register $PS_i(0)$, the pointer save register is selected for storing the current value of the pointer $P_i$ in accordance with the truth state of the signal currently stored in the master pointer PM. FIG. 3d indicates that the final operational stage in one cycle of roll-back point establishment is that the master pointer PM is complemented, as indicated by the encircled 1 drawn in the master pointer register PM.

It should now be evident that the next step in the following cycle of roll-back point establishment is again the complementing of the pointer register $P_i$ returning its content signal to the truth state 0 and the stage of operation corresponding to FIG. 3a. Of course, the next word to be written into register $R_i$ would, therefore, be written into the "0" image replacing the present contents (i.e. START) of register $R_i(0)$. The roll-back point establishment process continues cyclically, sequencing through the steps illustrated in FIGS. 3a–3d each time a word is to be written into register $R_i$. The new word is written into the register image containing the "older" contents. Accordingly, the image not being written into always represents a valid roll-back point, the contents of which are secure from disruption during a disruptive event, such as nuclear radiation.

If a nuclear event or other such disruptive event occurs, the recovery scheme subsequent to circumvention proceeds as follows:

1. The appropriate pointer save register, either $PS_i(0)$ or $PS_i(1)$, is selected in accordance with the complement of the truth state of the signal currently stored in the master pointer PM.

2. The truth state of the signal stored in the selected pointer save register is then used to reset the pointer $P_i$ so that the truth state of the signal stored in the pointer $P_i$ is made equal to the truth state of the signal stored in the selected pointer save register.

3. The truth state of the signal selected and forced into the pointer register $P_i$ is then used to select, in accordance with its value, either image "0" or "1" to ascertain which register is to be utilized as a source of a valid word for resuming normal operation subsequent to a circumvented disrupted environmental event.

It should be clear from the above-listed sequence of events for recovery that recovery from the circumvention stages represented by FIGS. 3a and 3b is rather simple. The 0 truth state of the signal in master pointer PM directs selection of pointer save register $Ps_i(1)$ (i.e. 0 is complemented to 1) which, in turn, forces the signal in pointer register $P_i$ to assume a truth stae 0. Consequently, the pointer establishes register $R_i(0)$ as the valid data word for resuming normal computer operations after recovery. The process of recovery from the circumvention stages corresponding to FIGS. 3c and 3d is illustrated in FIGS. 4a–4d.

In FIG. 4 the symbol "?" is used to denote that the signal has an unknown truth state due to circumvention. During the state of circumvention corresponding to FIG. 3c, the contents of $R_i(1)$ and $PS_i(0)$ are changing. After the disruptive event is completed the contents of those two registers may be scrambled and thus unknown, as indicated by the respective question marks. However, since the contents of the master pointer were not being changed during the stage of FIG. 3c, they remained intact and unaffected. The recovery routine would proceed as previously indicated. First, by selection of pointer save register $PS_i(1)$ (using the complement 1, of PM) as shown in FIG. 4a. Second, by the forcing of the pointer register $P_i$ to the same truth state, namely 0, as indicated in FIG. 4b. This action relative to pointer register $P_i$ results in selection of register $R_i(0)$ as also shown in FIG. 4b.

Figure 4A:
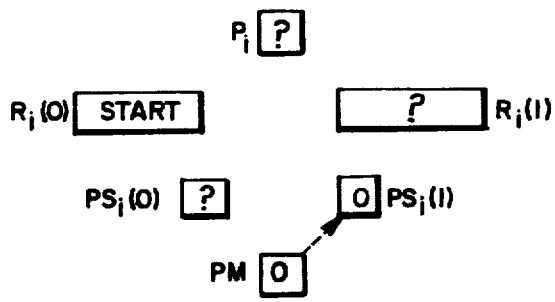
FIGS. 4a-4d are block diagrams which illustrate the manner in which previously established roll-back points are utilized in this invention.
Figure 4B:
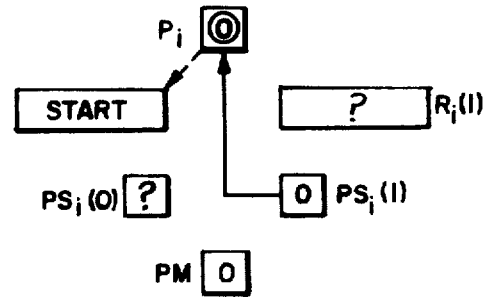
Figure 4C:
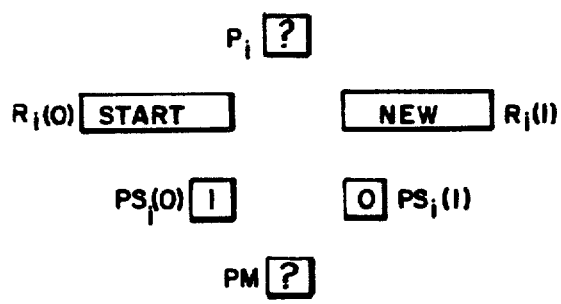
Figure 4D:
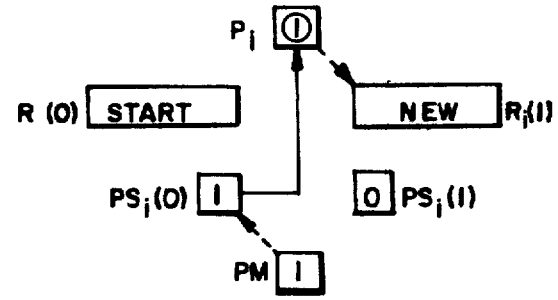

On the other hand, if the event occurs during the circumvention stage corresponding to FIG. 3d, that is, while the contents of the master pointer PM are changing, the contents of the master pointer at the time of recovery will be unknown as represented by the question mark shown in the master pointer PM of FIG. 4c. However, it is to be noted that at the stage corresponding to the circumvention represented by FIG. 3d, the word NEW will have been completely written into the register $R_i(1)$ and a 1 will have been written into $PS_i(0)$. Consequently, register $R_i(1)$ will contain a valid roll-back point. Accordingly, it will not matter at that point in the recovery sequence whether the truth state of the master pointer is 0 or a 1. If it is a 0, recovery will proceed as indicated previously in conjunction with FIGS. 4a and 4i b. On the other hand, if it is a 1, recovery will proceed as represented by FIG. 4d in that pointer save register $PS_i(0)$ will be selected. Its contents, being a signal having a truth state of 1, will force pointer register $P_i$ to a 1, irrespective of the truth state of the signal previously stored in pointer register $P_i$. Therefore, normal operations resume subsequent to recovery by the selection of register $R_i(1)$ to be used as a rollback point.

In summary, if a circumvention event occurs while the master pointer is being changed, both image registers of the dual registers provided for each file register contain a valid roll-back point. Accordingly, FIGS. 4a–4d illustrate that no matter when the disruptive event occurs in the circumvention sequence, recovery employing a known valid roll-back point will be successful and permit subsequent resumption of normal computer operations.

Figure 5:
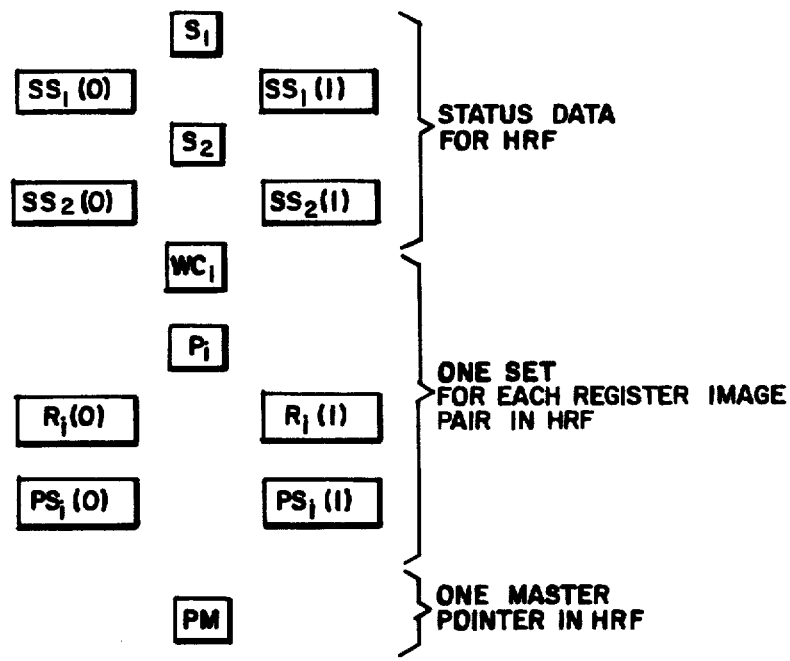
FIG. 5 is a general block diagram representation of the different functions of the storage elements of the invention.

FIG. 5 indicates the actual number of storage elements associated with each register $R_i$ of the preferred embodiment of a hardened register file (HRF) of the invention. As indicated in FIG. 5, the pointer register $P_i$, the two alternate images of register $R_i$, namely $R_i(0)$ and $R_i(1)$ and the two pointer save registers, $PS_i(0)$ and $PS_i(1)$ together comprise a set of storage elements that is included once for each register $R_i$. The single master pointer PM, which is used for all the registers $R_i$ in the hardened register file, is also indicated in FIG. 5.

Other registers which are ordinarily singularly present in the entire hardened register file, irrespective of the number of registers $R_i$, include the registers associated with status data stored in the hardened register file. It is assumed, for purposes of discussion, that in the embodiment discussed herein there are two such status bits, each of which is stored in a status register $S_1$ and $S_2$, respectively. Associated with each status register is a pair of status save registers. In particular, status save registers $SS_1(0)$ and $SS_1(1)$ are associated with status register $S_1$ while status save registers $SS_2(0)$ and $SS_2(1)$ are associated with status register $s_2$. The relationship between status registers and status save registers and the master pointer is the same as the relationship between the pointers, pointer save registers, and the master pointer, as previously discussed in conjunction with FIGS. 3 and 4. Accordingly, the contents of the status registers are determined in accordance with the contents of the status save registers, the choice of which is made in accordance with the truth state of the signal stored in master pointer PM. Each time the pointers are copied into the pointer save registers, the contents of the status register are loaded into the status save register selected in accordance with the truth state of the master pointer PM. Upon recovery, the status register is loaded with the contents of the status save register represented by the complement of the truth state of the signal in the master pointer at the time of the circumvention.

If a main memory unit write operation is in progress when a disruptive event occurs, the resulting contents of the addressed main memory unit may be scrambled and therefore erroneous. In this invention such a result can be avoided during a recovery sequence by rewriting the correct signals into that same main memory unit location. This is accomplished, in the preferred embodiment of the invention, by allocating one status register $S_i$ for storage of a status signal the truth state of which indicates whether the current computer instruction involves writing into the main memory unit. If such writing is indicated, the rewriting during recovery is executed. If no such writing is indicated, rewriting is omitted during recovery. The value to be written into memory is contained in a register and is, thus, preserved during the disruptive event.

An additional register, one such register being present in the hard register file for each register $R_i$, is a WRITE control register $WC_i$. The WRITE control register $WC_i$ is used to inhibit the complementing of the pointer register $P_i$ on those occasions when, although new data has been written into a register $R_i$, the change in data does not merit the establishment of the new contents of that register as a roll-back point. For example, when a register $R_i$ is being incremented during an operation in which it will be sequentially incremented a number of times before reaching a new meaningful status, it may not be established as a roll-back point upon each such increment because it would be a meaningless roll-back point until all such increments are completed. By means of the truth state of the signal stored therein, the WRITE control register $WC_i$ is used to inhibit the establishment of the incremented register as a roll-back point until all such increments or other similar operations are completed.

The operations of various storage elements in the hard register file that are associated with each storage location $R_i$ are shown in Table I which indicates the various operating modes of the hard register file. The column at the left indicates the various modes in which the hard register file may be placed. The column at the right indicates the corresponding operation of the hard register file performed in response to each such mode command. Thus, for example, as indicated in Table I, the command called CONTINUE results in a READ operation. Because none of the registers of the hard register file are written into during a READ operation, the prior contents of the previously established roll-back point will remain valid and there is no need to provide new roll-back points.

As indicated in Table I by the Exclusive-NOR function ⊕, in response to a WRITE command, a new word is written into a register $R_i$. The sequence for doing so involves first complementing the truth state of the signal stored in the pointer register $P_i$ if, and only if, the truth state of the WRITE control signal stored in the WRITE control register $WC_i$ is equal to 0. Then, as indicated in Table I, the WRITE operation causes writing of new signals into the image of register $R_i$ corresponding to the truth state of the complemented pointer register $P_i$. Finally in a WRITE operation, the truth state of the signal stored in the WRITE control register $WC_i$ is set equal to 1.

Table I

| | HRF Operating Modes |
|---|---|
| Command | Description |
| CONTINUE | No operation other than read is performed |
| WRITE | A new value is written into a register using the following sequence: $P_i = \overline{P_i \oplus WC_i}$ $R_i(P_i) = R_{IN}$ $WC_i = 1$ } for i addressed |
| SAVE | The pointers and status bits are saved and the write control flags are reset $SS_i(PM) = S_i$ $PS_i(PM) = P_i$ $WC_i = 0$ } for all i |
| TOGGLE | The Master Pointer is complemented $PM = \overline{PM}$ |
| COPY* | The Master Pointer is set equal to the input value $PM = P_{IN}$ |
| RESTORE* | The pointers and status bits are restored and the write control flags are reset $S_i = SS_i(\overline{PM})$ $P_i = PS_i(\overline{PM})$ $WC_i = 0$ } for all i |

Note:
All mode commands are latched and delayed one cycle.
All actions in response to a mode command take place within one cycle.
*Used only in circumvention recovery In response to a SAVE command, which is generated each time a WRITE command establishes a new roll-back point, the contents of the pointer registers $P_i$ and the status registers $S_i$ are saved and the WRITE CONTROL registers $WC_i$ are reset. The sequence of this operation is illustrated in Table 1. Thus, each time a SAVE command is applied to the hard register file, the status register $S_i$ contents are stored in the status save registers $SS_i$ selected in accordance with the truth state of the signal currently in the master pointer PM. The contents of the pointer registers $P_i$ are also saved in their respective pointer save registers $PS_i$, also selected in accordance with the truth state of the signal currently stored in the master pointer PM. Finally, the WRITE CONTROL register $WC_i$ is reset to store a signal having a truth state of 0.

The TOGGLE operation is the complementing of the signal stored in the master pointer PM so that as indicated in Table I, the new value of the signal stored in master pointer PM is made equal to the inverted value of the previously stored signal in master pointer PM.

The WRITE operation, the SAVE operation and the TOGGLE operation are normally performed in computer operations in which signals are written, in order to establish assured valid roll-back points for purposes of circumventing a disruptive event, such as the occurrence of nuclear radiation. On the other hand, the COPY command and the RESTORE command, as indicated in Table I by the symbol * and the note pertaining thereto are used only in circumvention recovery operations. In other words, COPY and RESTORE are usually generated only subsequent to the actual occurrence of a disruptive event.

As indicated in Table I, the COPY command results in the master pointer PM being set equal to an input value $P_{IN}$. This capability to cause the truth state of the signal stored in master pointer PM to correspond to an input signal truth state, is provided in order to permit use of a plurality of hard register files. A plurality of hard register files are used to increase storage capacity for either increasing the number of registers, or for increasing the size of the word capacity of each register, or for both reasons. In such cases of combined hard register file usage, it is desirable to permit the master pointer register PM of one selected hard register file to control the truth state of the signal stored in all other master pointers in the other hard register files during recovery from a circumvented event. In order to force the master pointer PM of each such additional hard register file to agree with the value of a selected master pointer, each hard register file is provided with the capability for receiving a pointer input signal $P_{IN}$ and also for generating a pointer output signal $P_{OUT}$. This will be discussed more fully below in a conjunction with FIGS. 6 and 8f.

The RESTORE command results in the pointer registers $P_1$ and status registers $S_i$ being set to store a signal having a truth state corresponding to the signal stored in the pointer save register $PS_i$ and status save register $SS_i$, respectively, selected in accordance with the complemented value of the current signal in master pointer PM, as shown in Table I. In addition, the WRITE control register $WC_i$ is reset so that the signal stored therein assumes a truth state of 0. As a result of the RESTORE operations, the status register $S_i$ will have a signal stored therein, the truth state of which represents a valid status bit corresponding to a roll-back point. Additionally, the pointer $P_i$ for each register $R_i$ will store a signal the truth state of which will select the proper corresponding image $R_i(0)$ or $R_i(1)$ which contains assured valid data for a roll-back point. As previously indicated, the operations COPY and RESTORE are performed only in a recovery operation following the circumvention of a disruptive event.

Figure 6:
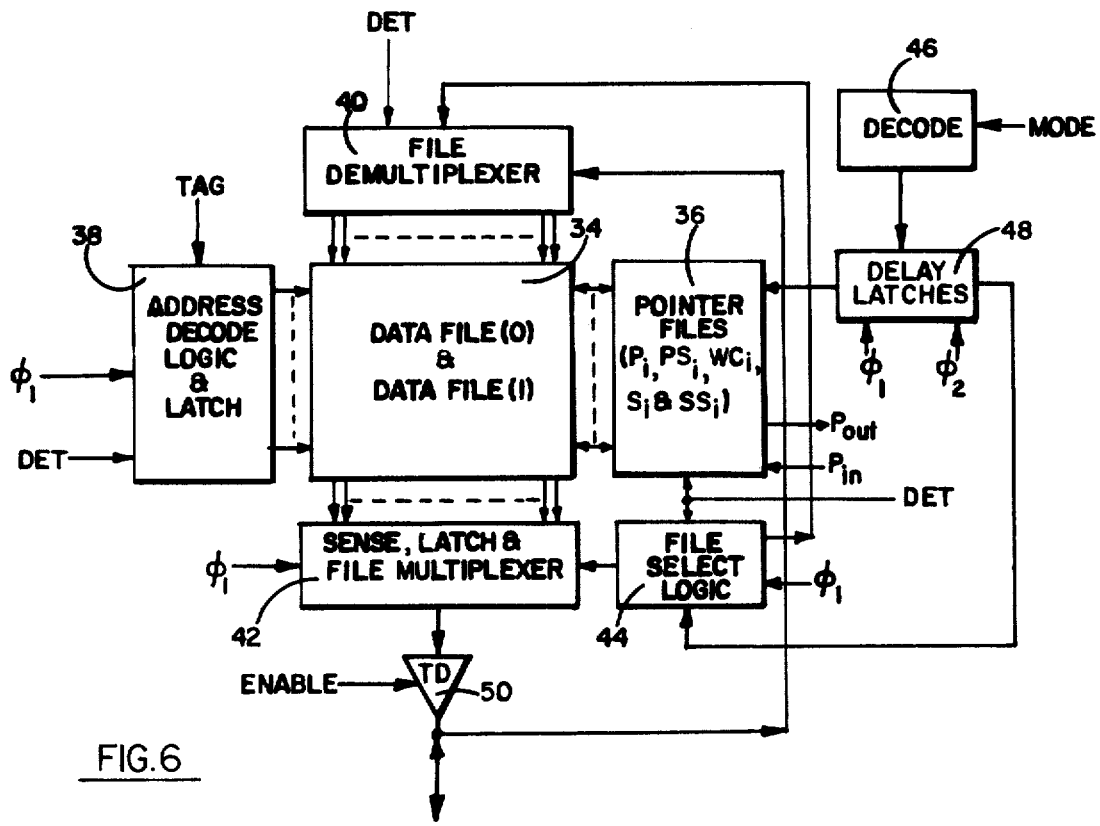
FIG. 6 is a block diagram of the hardened register file of the invention showing the interconnection between the internal portions of the hard register file and also showing input signals and output signals relating to the invention.
Figure 7:
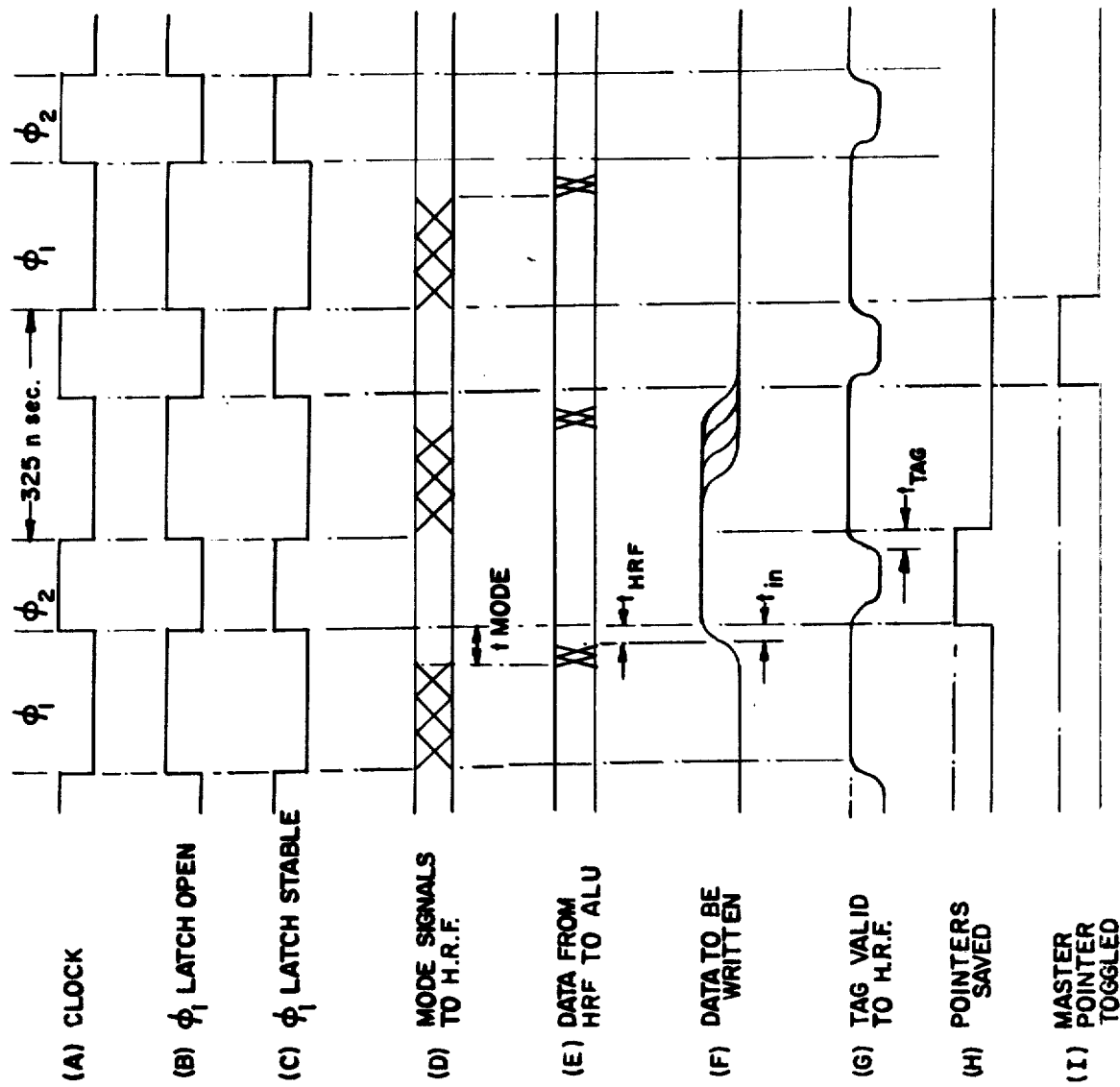
FIG. 7 is a timing diagram illustrating the timing relationships between various signals and events related to the invention.

The means by which the hard register file of this invention performs the operations of circumvention to establish roll-back points and recovery therefrom subsequent to a disruptive event, are now to be described in conjunction with FIGS. 6, 7 and 8.

As shown n FIG. 6, a hard register file of this invention comprises data file block 34, pointer file block 36, address decode logic and latch circuit 38, input file demultiplexer 40, sense, latch and output file multiplexer 42, file select logic circuit 44, mode decoder 46, delay latches 48 and tristate drivers 50. These elements of the hard register file are interconnected for row/-column control of the data storage elements of the register file.

Data file block 34 comprises the sets of image registers data file (0) and data file (1) arranged in addressable rows and columns. Pointer file block 36 comprises the associated pointer registers $P_i$, pointer save registers $PS_i$, and write control registers $WC_i$ arranged in rows to be selected with their corresponding image registers. The status registers $S_i$, status save registers $SS_i$ and master pointer register PM are also located in pointer file block 36. Accordingly there is bidirectional signal flow along selected rows between the blocks 34 and 36.

Address decode logic and latch circuit 38 receives TAG address signals which are decoded for selection of the appropriate row of registers in blocks 34 and 36. Thus circuit 38 is shown connected to block 34 for such row selection.

File demultiplexer 40 is connected to block 34 to apply data signals to the appropriate bit colums of selected registers, and sense, latch and file demultiplexer 42 is connected to block 34 to sense the signal contents of the bit columns of selected registers and to apply such signal contents to the tri-state output drivers 50.

File select logic circuit 44 is connected to file demultiplexer 40 and to multiplexer 42 to control register image selection. Circuit 44 is also connected to pointer file block 36 and latch circuit 48 to respond to the appropriate pointer registers depending on the type of mode command signals applied to decode circuit 46.

Delay latch circuit 48 is interposed between decode circuit 46 and the remaining circuits of the hard register file HRF to present implementation delays as described below. Clock signals and detector signal DET are applied to the circuits as shown in FIG. 6 to synchronize file operations and to initiate circumvention and recovery operations, respectively. Hardened register file operation is controlled in accordance with the signals shown in FIG. 7, such as clock signal CLOCK, input address signals TAG and mode signals MODE. In addition, the master pointer input and output signals $P_{IN}$ and $P_{OUT}$, may be used for purposes of recovery under the control of a common master pointer, when a plurality of hard register files are combined for interrelated operations.

In one embodiment of the hard register file, all of the circuits represented in FIG. 6 are located on a single complementary metal oxide semiconductor, silicon-on-sapphire (CMOS/SOS) LSI chip. Each such chip provides eight pairs of register images, each such image having a capacity of eight bits. Typically, the chip has dimensions of 250×250 mils.

The data file block 34 contains the dual set of eight image registers, $R_1$, denoted by Data File (0) and Data File (1), respectively, Pointer file block 36 includes storage elements for storing pointer signals, pointer save signals and write control signals denoted respectively by the symbols $P_i$, $PS_i$ and $WC_i$. The master pointer PM, the status register $S_i$ and status save registers $SS_i$ are also located in pointer file block 36.

Address decode logic and latch circuit 38 receives a set of address signals, TAG, which selects from data file block 34 one row of register image files and also selects from pointer files block 36 a corresponding row of pointer registers, and write control registers for the purpose of either writing new data into such registers or sensing data already contained in such registers. File demultiplexer 40 and sense, latch and file multiplexer 42, provide the means for converting a set of input data signals or a set of output data signals into the dual sets of signals utilized for writing into one of the two images or for reading out of one of the two images, depending upon the selection made in accordance with the corresponding pointer register $P_i$. The selection between the two sets of images for controlling the file demultiplexer 40 and the sense, latch and file multiplexer 42, is made under the control of file select logic circuit 44 which in turn responds to the truth state of the selected pointer register $P_i$ for selecting either image 0 or image 1 of the data file for purposes of writing or reading data.

As previously discussed in conjunction with Table I, the hard register file is capable of operating of operating in six different modes, namely the CONTINUE, WRITE, SAVE, TOGGLE, COPY, and RESTORE modes. The last two modes are implemented only for purposes of recovery. The command signals MODE that determine in which mode the hard register file is to operate, are applied to hard register file decode circuit 46 which converts the MODE signals to a format recognizable by the hard register file. These decoded signals are all latched and delayed one cycle time ($\phi_1+\phi_2$) to prevent circumvention before a write operation commences, thereby giving a radiation detector the opportunity to respond to such radiation and provide the appropriate signal DET for initiating circumvention. The delay in the MODE signals prevents radiation induced spurious signals from erroneously commanding a write operation before the radiation detector signal DET has been applied to the hard register file.

FIG. 7 indicates the time relationships between the portions of the clock signal CLOCK and also indicates availability of valid signals at various points in the hard register file. As shown in FIG. 7, in one embodiment of the invention the clock signal (waveform A) comprises a non-symmetrical, rectangular waveform having a 325 nanosecond period including a longer portion $\phi_1$ and a shorter portion $\phi_2$. Waveform (b) and (C) in FIG. 7, indicate that during the $\phi_1$ portion of the clock signal period, $\phi_1$ latches are open. That is, the latches are receptive to input signals. Likewise, during the $\phi_2$ portion of the clock period, the $\phi_1$ latches are no longer capable of receiving input signals but instead provide a stable output signal, the truth state of which equals the last value of input signal received during the $\phi_1$ period.

In FIG. 6, the symbol $\phi_1$ or $\phi_2$ is used to designate the corresponding interval of the applied signal CLOCK during which the latches or gate circuits are receptive to input signals. Accordingly, as shown in FIG. 6, latches or gate circuits in address decode logic and latch circuit 38, in sense, latch and file multiplexer 42, in file select logic circuit 44, and in delay latch circuit 48, are receptive to input signals during the $\phi_1$ interval of clock signal CLOCK.

Waveforms (D), (E), (F) and (G) of FIG. 7 illustrate some of the time requirements for the signals relating to operation of one embodiment of the hard register file. For example, waveform (D) indicates that mode signals MODE tranferred to the hard register file to command circumvention and/or recovery operations, are present at the input terminals to decode circuit 46 during the $\phi_1$ portion of the clock period and are typically valid and stable at the hard register file for some period preceding the $\phi_1$ to $\phi_2$ clock transition, as indicated by the time $t_{MODE}$ of waveform (D). Waveform (E) shows that, if data is to be transferred from the hard register file to an arithmetic logic unit (ALU) as a result of a prior command signal, the data from the hard register file should be available during the time the MODE signals to the hard register file are available and must definitely be available during the time $t_{HRF}$ occurring just prior to the $\phi_1$ to $\phi_2$ transition.

On the other hand, if, as a result of the MODE signals transferred to the hard register file, data is to be written into the hard register file, such data must be available at the hard register file input terminals at file demultiplexer 40 prior to the $\phi_1$ to $\phi_2$ transition, as indicated by the time $t_{IN}$. As indicated by waveform (G), TAG information, that is, address signals transferred to address decode logic and latch circuit 38 for addressing specific register rows within the file, must be available at the hard register file prior to the preceding $\phi_2$ to $\phi_1$ transition as indicated by the time $t_{TAG}$. The X's preceding the times $t_{MODE}$ and $t_{HRF}$ represent an approximate range of times in which the corresponding signals may become available.

In one embodiment of this invention, the times $t_{MODE}$, $t_{HRF}$, $t_{IN}$, and $t_{TAG}$ conform to the minimum values indicated in Table II.

TABLE II

| Time | Required Commencement |
|---|---|
| $t_{MODE}$ | Greater than 75 nanoseconds before $\phi_1$ to $\phi_2$ transition |
| $t_{HRF}$ | Greater than 10 nanoseconds before $\phi_1$ to $\phi_2$ transition |
| $t_{IN}$ | Greater than 0 (i.e. must be present at hard register file before $\phi_1$ to $\phi_2$ transition). |
| $t_{TAG}$ | Greater than 45 nanoseconds before $\phi_2$ to $\phi_1$ transition. |

In FIG. 7, waveforms (H) and (I), indicate the nominal times when the contents of pointers $P_i$ are saved in one of two pointer save registers $PS_i(0)$ or $PS_i(1)$ and when the master pointer PM is toggled, that is, when its contents are complemented.

Figure 8A:
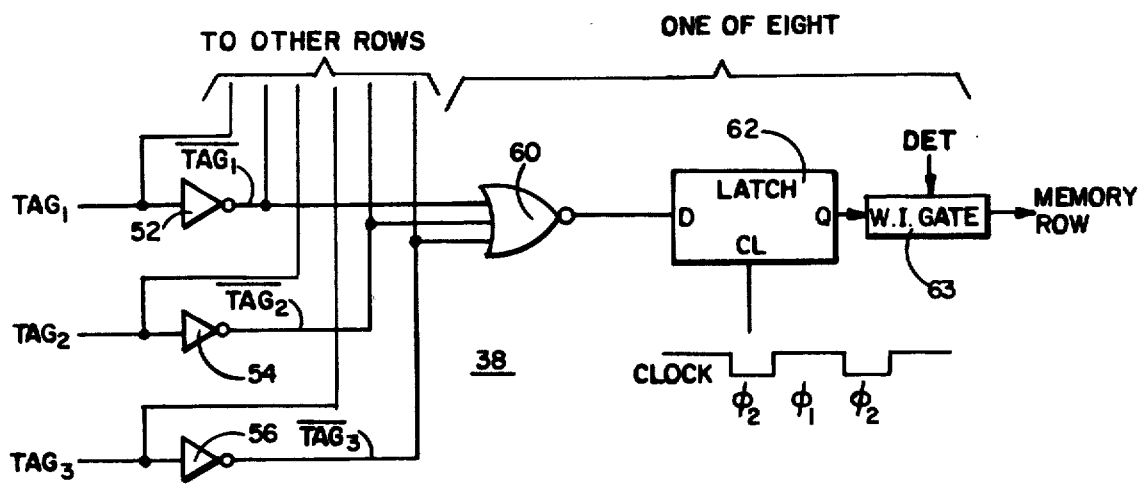
FIGS. 8a-8f are detailed logic diagrams of portions of the invention.

A representative portion of the address decode logic and latch 38 is shown in FIG. 8A. In the embodiment illustrated, three address signals namely $TAG_1$, $TAG_2$ and $TAG_3$ and the complements thereof are applied in various combinations to three input NOR gates such as three input NOR gate 60 and the NOR gate 60 output terminal is connected to a D-type latch 62. FIG. 8A illustrates one such combination of TAG signals, namely an address comprising the complement of each such signal as indicated. These three signals are applied to inverters 52, 54 and 56 respectively, the outputs of which are each connected to the input terminals of NOR gate 60. The output terminal of NOR gate 60 is applied to the D terminal of D-type latch 62. The output signal at terminal Q of D-type latch 62 is applied to a write inhibit gate 63 before being applied to the appropriate row of data file block 34. The output signal DET of a radiation detector which senses a radiation event, controls gate 62 to inhibit writing into all cells until computer voltages are stabilized after recovery. The output signal of gate 63 is applied to one of eight possible rows of data files in data file block 34. Clock signal CLOCK is applied to the clock terminal CL of D-type latch 62.

The input timing in one embodiment of the invention calls for the address signals TAG to be valid at the input terminal of address decode logic and latch 38 more than 45 nanoseconds before the $\phi_1$ to $\phi_2$ clock transition. Accordingly, the output signals of the address decode logic and latch 38 are valid at the start of the $\phi_1$ clock period when the D-type latch 62 is receptive to input signals. Consequently, changes in row selection addresses occur at the $\phi_2$ to $\phi_1$ clock transition and the row selection signals remain constant through the following $\phi_1$ and $\phi_2$ clock intervals until the next $\phi_2$ to $\phi_1$ transition.

Figure 8B:
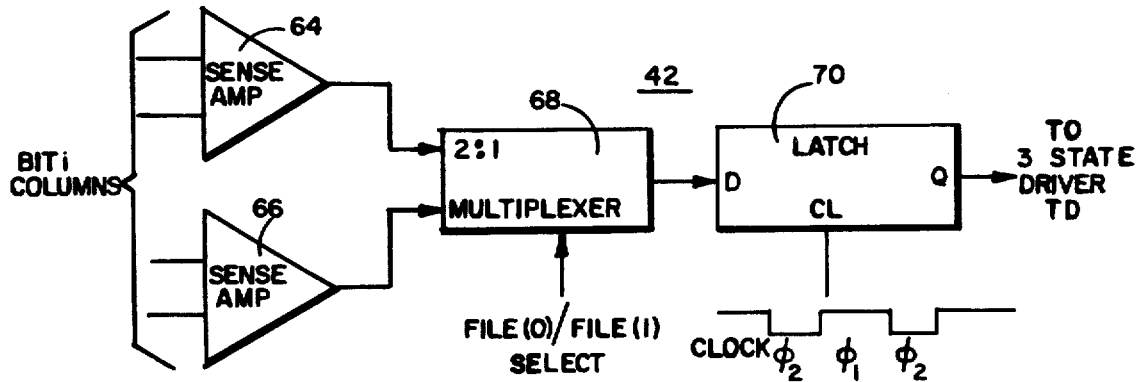

FIG. 8B represents a portion of sense, latch and file multiplexer 42 for one of the bit columns of data file block 34. Each row of data file block 34 in the embodiment illustrated has 16 columns. Each column and row defines one bit location or memory cell for storing ine binary digit for information. The input terminals of differential sense amplifiers 64 and 66 are connected respectively to the column sense lines of two memory cells that comprise the "0" and "1" images of bit i.

Although not shown in the drawings, the organization of data file block 34 is such that the two images of each bit i are in adjacent columns so that the input signals to the corresponding sense amplifier, such as 64 and 66, are derived from adjacent columns in data file block 34. The sense amplifiers 64 and 66 each sense the voltage relationship present on bit lines in the memory cell to which the amplifier is connected and generate a corresponding signal that is a ZERO signal where one voltage exceeds the other and a ONE signal where the opposite voltage relationship occurs.

Referring again to FIG. 8B, the output terminals of sense amplifiers 64 and 66 are applied to the input terminals of 2:1 multiplexer 68 to which a third input signal, namely File (0)/File (1) Select is also applied. This latter signal selects one of the two input signals for application to the output terminal of the 2:1 multiplexer 68. The file select signal applied to each such multiplexer in the sense, latch and file multiplexer 42, is derived from the file select logic circuit 44 and makes the selection in accordance with the truth state of the signal contained in the corresponding pointer register $P_i$.

The output signal of 2:1 multiplexer 68 is applied to the D terminal of latch 70. The output signal of latch 70 is, in turn, made available to the tristate drivers 50 shown in FIG. 6. The clock signal CLOCK is applied to the clock terminal CL of latch 70 whereby the output signals available to tristate drivers 50 are held stable during the $\phi_2$ clock interval.

Figure 8C:
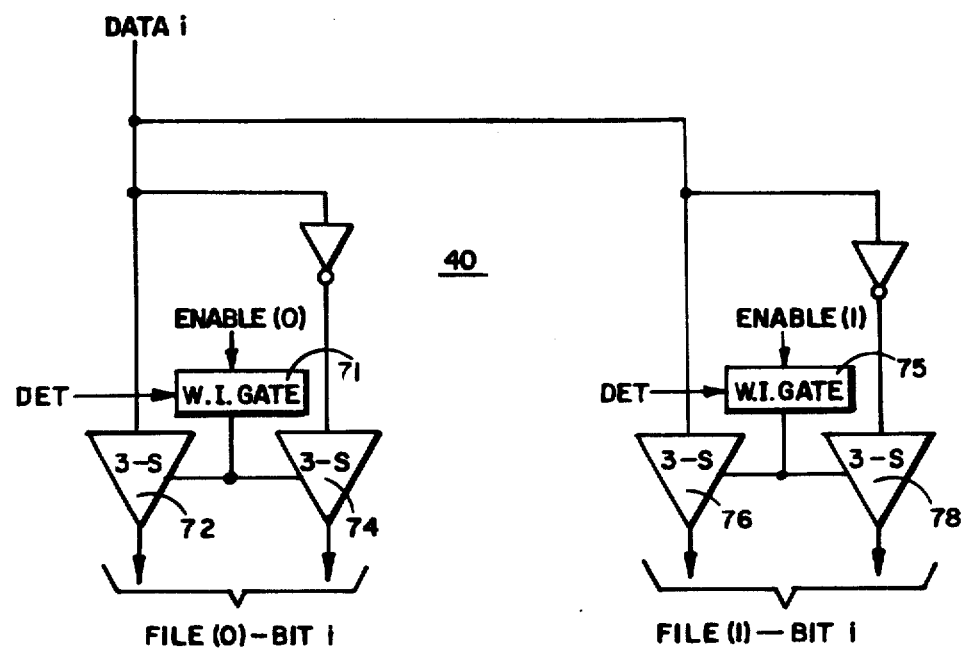
Figure 8D:
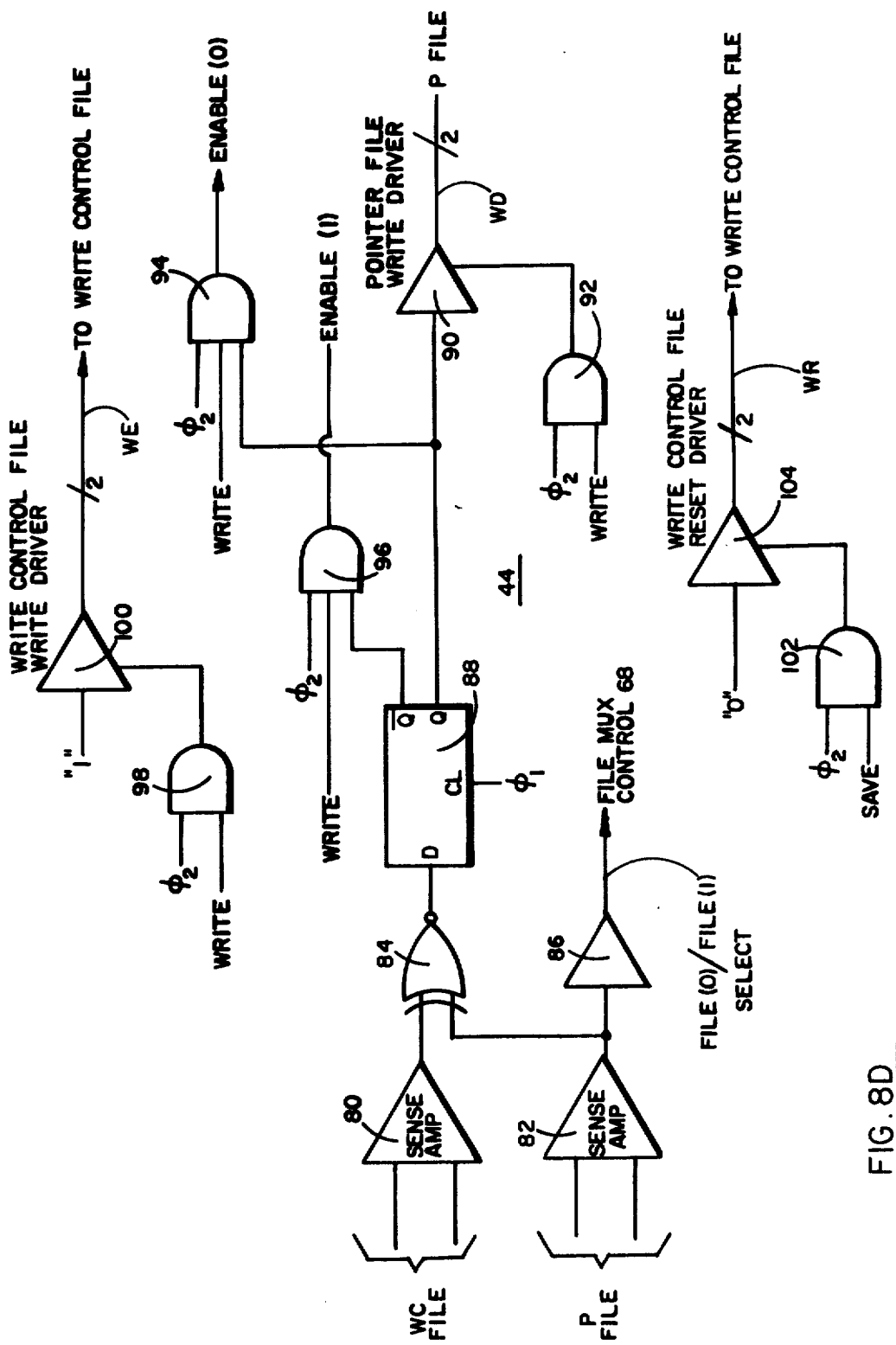

Data signals that are to be written into the hard register file are applied in the data file block 34 by means of file demultiplexer 40. FIG. 8C represents a portion of file demultiplexer 40 that is used to separate a data signal $DATA_1$ into a corresponding pair of signals for application to one of the images in the hard register file. Writing into the storage elements of the hard register file is accomplished differentially with two tristate drivers for each bit column of the data file block 34. Demultiplexing is accomplished by using separate enable signals, namely ENABLE (0) and ENABLE (1) respectively for the "0" image and "1" image to enable one pair of write drivers 72, 74, 76 and 78 of FIG. 8C. The enable signals are generated by the file select logic 44 as shown in FIG. 8D and enable the Write drivers if in a true state of 1 only during the $\phi_2$ clock interval. Write inhibit gates 71 and 75 serve the same purpose as gate 63 of FIG. 8A.

The file select logic circuit 44 is shown in more detail in FIG. 8D. File select logic circuit 44 generates the control signal FILE (0)/FILE (1) SELECT that is applied to the sense, latch and file multiplexer 42 (FIG. 8B) to select one of the two columns for sensing. It also generates the two enable signals ENABLE (0) and ENABLE (1) that are applied to the file demultiplexer 40 (FIG. 8C) to enable one of the two images for writing. Furthermore, the file select logic circuit 44 generates write enable signals WE and write reset signals WR that are applied to the write control registers $WC_i$ in the pointer files 36, in response to signals applied to MODE decoder 46. The file select logic circuit 44 also generates pointer file write driver signals WD which are applied to the pointer file 36 to change the state of the selected pointer register in response to an exclusive NOR function, as defined previously in Table I.

As shown in the leftmost portion of FIG. 8D, the output signals ($W_c$ FILE) of the write control file column, and the output signals ($P_i$ FILE) of the pointer file column of pointer files 36 are applied, respectively, to sense amplifier 80 and to sense amplifier 82. These sense amplifiers are also of the differential type as previously described in conjunction with FIG. 8B. Accordingly, amplifiers 80 and 82 sense the truth state of the write control register and pointer register selected in accordance with the row address generated by the address decode logic and latch circuit 38. The output signal of sense amplifier 82 is applied, via driver 86, to sense, latch and file multiplexer 42 for the purpose of selecting the appropriate image to be applied to the tristate drivers 50. In addition, the output signal of sense amplifier 82 is applied to one input terminal of exclusive NOR gate 84. The other input terminal of exclusive NOR gate 84 is connected to the output terminal of sense amplifier 80.

As is well known in the computer/logic arts, Exclusive-NOR gate 84 operates to invert the truth state of the output signal of driver 82 whenever the output signal of driver 80 is ZERO, and gate 84 operates to retain the truth state of the output signal of driver 82 whenever the output signal of driver 80 is ONE. The output signal of exclusive NOR gate 84 is applied to the D terminal of latch 88, the Q output terminal of which is connected to pointer file write driver 90. The output of pointer file write driver 90 is applied to the two lines of the selected pointer register of the pointer file in pointer file 36, when the write signal and a TRUE $\phi_2$ clock interval signal are both applied to AND gate 92 to enable pointer file write driver 90. Thus, exclusive NOR gate 84 performs the logic operation, in a write mode controlling the truth state of the signal stored in the corresponding pointer register as previously discussed in conjunction with Table I.

The Q output terminal of latch 88 is also connected to one input line of three-input AND gate 94. The other input terminals of gate 94 are supplied with the two input signals, $\phi_2$ and WRITE to selectively produce the output signal ENABLE (0). Similarly the $\overline{Q}$ terminal of latch 88 is connected to AND gate 96 to which the other two input signals $\phi_2$ and WRITE are applied to selectively produce the output signal ENABLE (1).

The SAVE signal generated by the decode circuit 46 in response to a SAVE mode command, and the $\phi_2$ portion of the CLOCK signal are applied to AND gate 102, the output signal of which is applied to the enable terminal of driver 104 to produce the write control file reset signal to be transferred to the write control file portion of pointer files 36. Similarly, the WRITE command signal and the $\phi_2$ signal are applied to AND gate 98, the output signal of which is applied to the enable terminal of driver 100 to produce the write control signal to be applied to the write control file portion of pointer files 36. As shown in FIG. 8D, the input terminal of driver 100 is tied to a logic ONE, and the input terminal to driver 104 is tied to a logic ZERO.

D-type latch 88 is receptive to input signals during the $\phi_1$ interval of the CLOCK signal and holds the output signals at terminals Q and $\overline{Q}$ stable during the $\phi_2$ interval of the clock signal. This condition provides a steady or stable input signal to the pointer file write driver 90. Also, latch 88 prevents changes in the write control file or in the pointer file from propagating through the file select logic 44 to affect the write driver at the improper time.

Figure 8E:
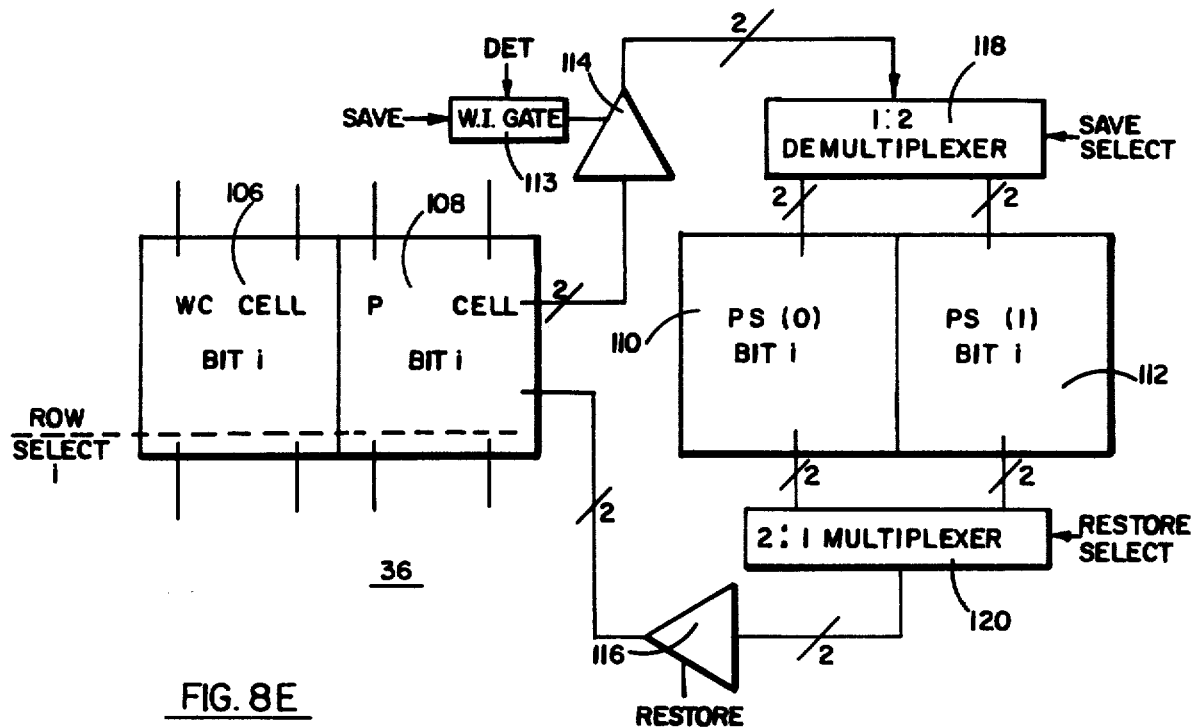

FIG. 8E depicts the elements of the pointer file block 36 of FIG. 6. The write control cell 106, pointer cell 108 and pointer save cells 110 and 112 for bit i are shown in FIG. 8E as an illustrative example of the entire contents of pointer files 36. The write control file and pointer file (forming part of pointer file 36 as shown in FIG. 6) are each addressed with the same set of row select lines that are used to address the data files and data file block 34.

As previously indicated, and as shown in FIG. 6, the master pointer cell PM is located in pointer file 36.

As shown in FIG. 8E, write control cell 106 and pointer cell 108 for row i are responsive to the row select line for row i, and are enabled by the address decode logic and latch circuit 38 as previously described in conjunction with FIG. 8A. When enabled by the SAVE mode signal, driver 114 transmits the contents of pointer cell 108 to 1:2 demultiplexer 118 for storage in one of the pointer save registers 110 and 112 determined in accordance with the truth state of the save select signal generated by the master pointer as indicated below in conjunction with FIG. 8F. Similarly the contents previously saved in either pointer save register 110 or pointer save register 112 are transmitted to the pointer register 108 by means of 2:1 multiplexer 120 and driver 116. The appropriate pointer save register for applying a signal to pointer register 108 is selected by means of the 2:1 multiplexer in accordance with the restore select signal generated by the master pointer as described below in conjunction with FIG. 8F. The output of the 2:1 multiplexer is then applied to driver 116 which, as indicated in FIG. 8E, is enabled in response to a RESTORE mode signal. Write inhibit gate 113 serves the same purpose as gate 63 of FIG. 8A.

Figure 8F:
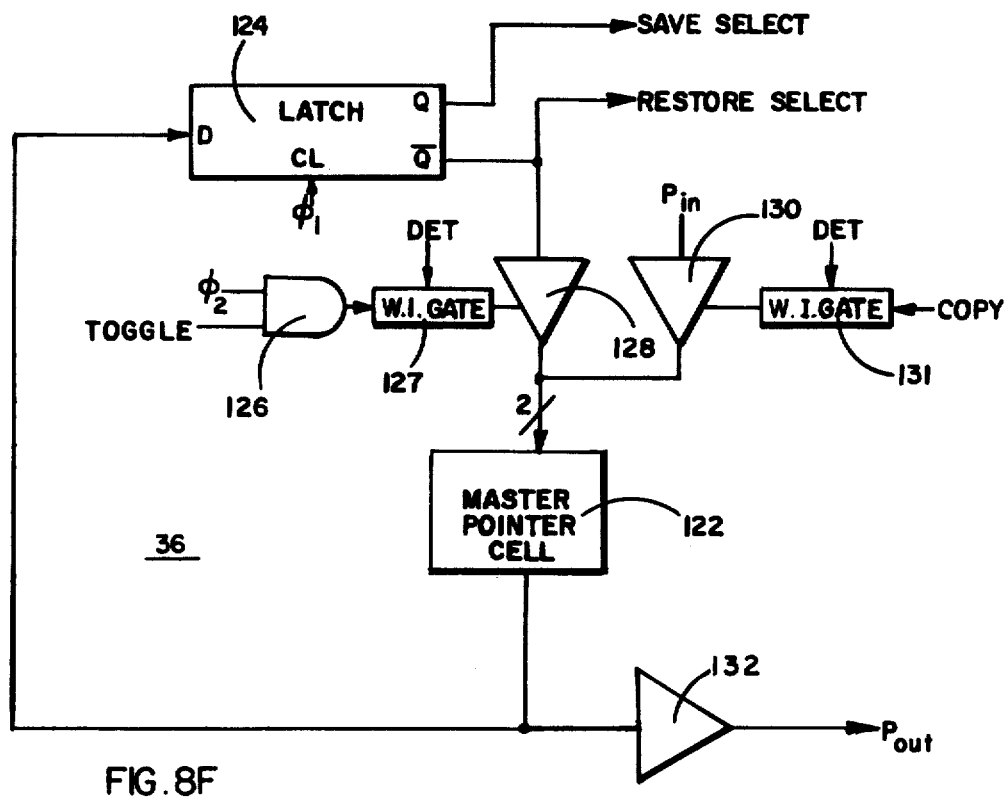

FIG. 8F shows the master pointer portion of pointer file 36 including master pointer cell 122, D-type latch 124, AND gate 126 and driver 128, 130 and 132. As previously described, the master pointer is a single cell storage element that stores a signal, the truth state of which is toggled from one state to the other in response to the TOGGLE command. The manner in which the toggling is implemented is readily evident from FIG. 8F which shows that the output of master pointer cell 122 is applied to the D terminal of latch 124 and that the inverted output signal of latch 124, available at output terminal $\overline{Q}$, is applied via driver 128 to the input terminal of master pointer cell 122. Driver 128, however, being a tristate device, is enabled only when the TOGGLE command signal and a true $\phi_2$ clock interval are applied simultaneously to AND gate 126 and write inhibit gate 127 is enabled by the detector signal DET.

As mentioned previously, when a plurality of hard register files are to be used in combination to increase the storage capacity of such a file, it is desirable, during a recovery operation, to cause all of the master pointers to track one designated lead master pointer. Accordingly, provision for such control is made by means of a master pointer output signal $P_{OUT}$ produced by driver 132. The signal $P_{OUT}$ is transferred from the master pointer on one hard register file chip to the master pointer on all of the chips. The signal $P_{IN}$ is used to load each master pointer and the signal $P_{OUT}$ is used to transfer the output of the selected master cell to the other cells. Accordingly FIG. 8F indicates the signal $P_{IN}$ being applied to driver 130 which is enabled when the hard register file receives a true COPY command signal. On the other hand, the output of the master ointer cell 122 is also applied to driver 132 and made available at all times at the output of the driver in the form of the signal $P_{OUT}$.

As also indicated in FIG. 8F, D-type latch 124 provides at its Q and $\overline{Q}$ terminals respectively, the Save Select and the Restore select signals utilized in the pointer file 36 (FIG. 8E) for purposes of selecting one of the two pointer status registers for bit i as previously described in conjunction with FIG. 8E. Write inhibit gates 127 and 131 serve the same purpose as gate 63 of FIG. 8A.

Mode decode circuit 46 (FIG. 6) is a three line to six line decoder which produces the output signals CONTINUE, WRITE, SAVE, TOGGLE, COPY and RESET. The output signals of the mode decode circuit 46 are latched in a series of master/slave latches to delay their application to the remaining portions of the hard register file until the following microcycle, that is, the following $\phi_1$ and $\phi_2$ intervals. This delay, as previously indicated, permits a nuclear radiation detection device adequate time to effect circumvention and recovery cycles in response to such a disruptive event.

Tristate drivers 50 (FIG. 6) are enabled by an external control signal ENABLE. It will now be understood that if a number of hard register files are to be combined for the purposes of increasing the storage capacity of such a file, the ENABLE signal applied to output tristate drivers 50 could be replaced by a combination of a chip select signal and such an ENABLE signal to enable the tristate output drivers of only the selected hard register file.

Figure 9:
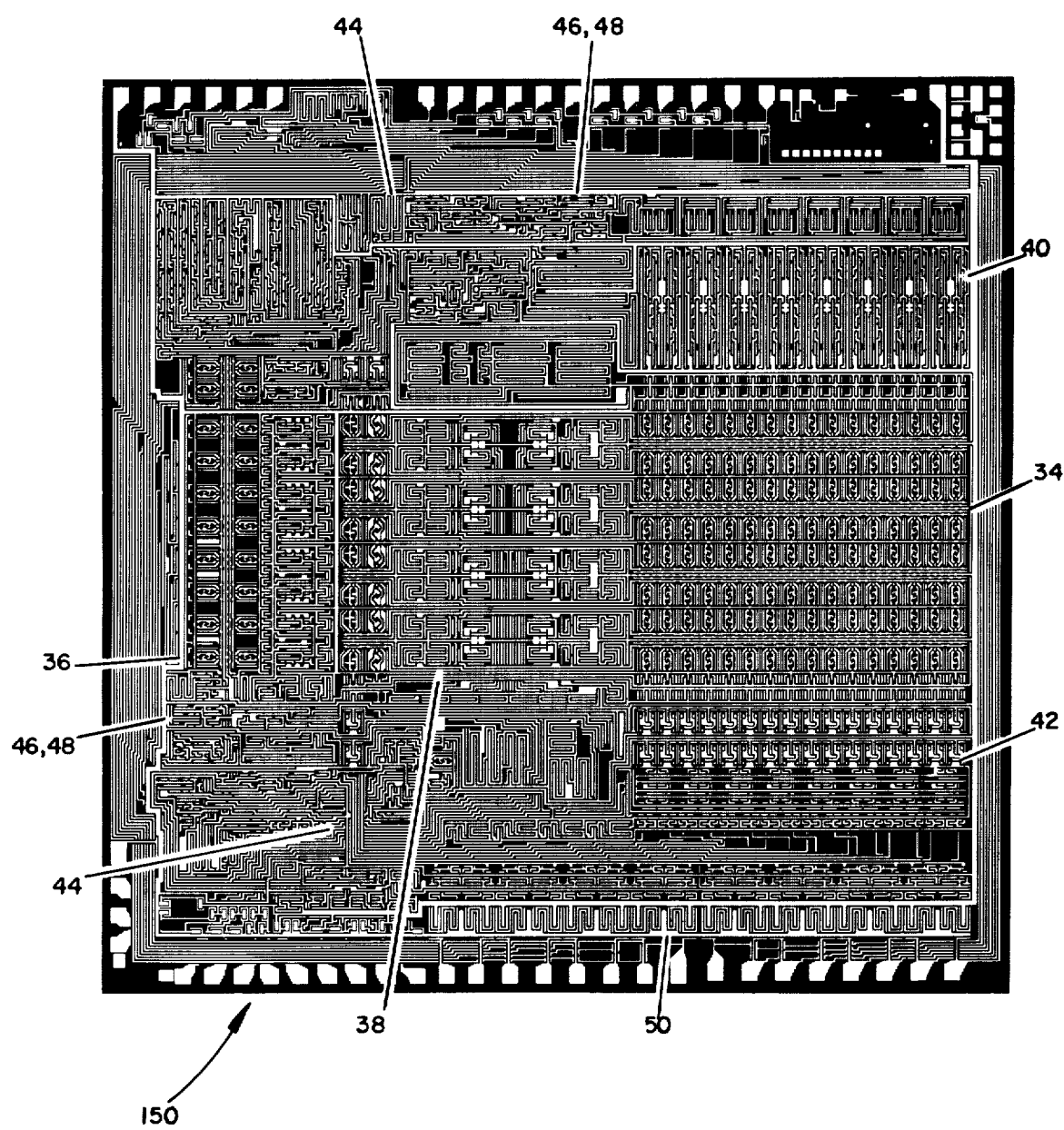
FIG. 9 is a metal mask lithographic illustration of a single chip embodiment of the invention.

Referring now to FIG. 9, a photolithographic print of the metallization pattern of a single semiconductor chip 150 comprising the hardened register file of this invention, like reference numerals are employed in FIG. 9 to identify the components illustrated and described hereinabove.

The data file circuit 34, the pointer file circuit 36, address decode logic and latch circuit 38, file demultiplexer 40, sense, latch and file multiplexer 42, file select logic circuit 44, decode circuit and delay latches 46, 48 and tristate drivers 50 are identified by reference numerals with associated lead lines defining the general areas of location on chip 150.

The actual chip 150 is somewhat larger than it would have to be to include the invention described hereinabove because it includes certain additional functions which are not germane to the invention described. For example, the chip 150 includes combinational logic for selectively combining status register bits to produce a single output for use in the computer system in which the particular chip 150 is utilized. However, such combinational logic is not contemplated to be within the scope of this invention and it is not relevant to the manufacture and use of the hardened register file.

Accordingly, it may be seen that a single chip hardened register file is provided.

SUMMARY

The hard register file of this invention constitutes a circumvention device for use in central processing units of digital computers that are capable of resuming normal operations subsequent to a disruptive event. The hard register file renders the central processing unit intrinsically hardened against disruptive events by establishing a valid roll-back point for each computer instruction that results in a word being written into the register file. Each such roll-back point provides undistorted data that may be used to restore computer functions during a recovery sequence. This hardening of the central processing unit is accomplished entirely in hardware form thus avoiding the software cost and throughput performance penalties associated with prior art software circumvention techniques. Furthermore, high speed CMOS/SOS hardened circuits permit utilization of the hard register file of the invention with a maximum of redundancy over conventional register files and, thus, limit hardware cost impact to a nominal level. The level of hardening for nuclear radiation achieved in the invention, satisfies the hardened device requirements specified at page 21 of a publication of Rockwell International entitled: *Silicon-On-Sapphire/Large-Scale-Integration*, Pub. No. P75-519/201(4959) dated August 1975.

For purposes of simplifying the explanation of the invention, language has been utilized which may sound like it is concerned with mental processes but which is in fact concerned with physical processes. For example, the terms "instruction", "information", "data", and "word", particularly where reference is made to storage and transfer thereof, refer specifically to instruction signals, information signals, data signals and word signals or other manifestations of instructions, information, data and words which are capable of physical manipulation.

In the embodiment of the invention described, the signals in question are stored in binary form in cells comprising field effect transistors that exhibit one voltage level to represent a value ZERO, and another voltage level to represent a value ONE in the binary system. The term "register" is used herein to mean one or more such cells as well as one or more storage cells of any other device, material or physical process capable of representing a ONE and a ZERO.

It is to be understood that while the invention has been described with particular reference to signals in binary form, signals in other logic form, such as ternary form, may be considered within the scope of this invention. Furthermore, it is to be understood that while binary signals described herein in conjunction with invention are considered to be in a ONE or TRUE state when at a constant voltage level, such as +5 volts DC and are considered to be in a ZERO or FALSE state when at a constant voltage level, such as 0 volts DC, the scope of this invention also includes binary signals the states of which depend upon the direction of change from one voltage level to another. It will be also understood that the term "transfer data signals" and similar expressions refer to the manipulation of those signals or manifestations.

Many details of a type which would be obvious to one skilled in the art have been omitted to avoid obfuscation of the essential features of the invention. For example, not all of the possible details of the logic circuits of this invention have been described.

The voltage relationships and other features of the basic cell design utilized in the hard register file of this invention form the subject of an independent and distinct invention which is disclosed in patent application Ser. No. 756,454, filed on Jan 3, 1977, now Pat. No. 4,130,892 assigned to the assignee of the present invention. Similarly, digital computers and central processing units thereof in which this invention may be utilized, have not been described fully herein because such details are not pertinent to a complete understanding of the invention afforded herein.

The invention described herein may be employed in many ways different from those specifically set forth, and many variations may be made therein. This description is intended to be illustrative only and is not intended to be limitative. The scope of the invention is limited only by the scope of the claims appended hereto.

Having, thus, described a preferred embodiment of this invention, what is claimed is:

1. An information handling apparatus having a central processing unit and a memory unit, the central processing unit having a register file unit for temporarily storing sets of data signals in accordance with instruction signals fetched from the memory unit by the central processing unit, the register file unit comprising:
    a first plurality of registers, said first plurality having at least one group of alternate data registers for storing each set of data signals fetched from said memory unit in one of said alternate registers selected in accordance with the truth state of a corresponding pointer register;
    a second plurality of registers, said second plurality having at least one pointer register corresponding to each group of alternate data registers, said pointer register having means for registering the truth state of a pointer signal for selecting one register of a corresponding group of data registers to be utilized for either writing or reading a set of data signals;
    a third plurality of registers, said third plurality having at least two pointer save registers corresponding to each pointer register for communication with the corresponding pointer register for either storing a pointer save signal representing the truth state of the corresponding pointer register or for forcing the truth state of the corresponding pointer register to a value that corresponds to said pointer save signal;
    a master pointer register having means for registering the truth state of a pointer selection signal for selecting one of said pointer save registers for communication with the corresponding pointer register; and
    means for complementing the truth state of each pointer register signal and of the master pointer signal for each occurrence of writing of data signals into a data register in the register file unit;
    each of said first, second and third pluralities and said master pointer being resistant to disruption of the signals stored respectively therein in response to an otherwise disrupting event, whereby at least one circumvention roll-back point of valid data signals is established for each set of data signals written into said register file unit.

2. The register file unit of claim 1, further comprising:
    a fourth plurality of registers, said fourth plurality having at least one write control register corresponding to each pointer register, each such write control register having means for registering the truth state of a write control signal for selectively inhibiting the complementing of the truth state of the corresponding pointer register signal.

3. The register file unit of claim 1, further comprising:
    nuclear radiation detection means for generating a signal in response to detection of a nuclear radiation event; and
    means coupling said signal generated by said nuclear radiation detecting means to said central processing unit for initiating a recovery operation; and
    means responsive to said central processing unit during a recovery operation for employing the most recently established circumvention roll-back-point for establishing normal operations in said information handling apparatus subsequent to said recovery operation.

4. The register file unit of claim 1 wherein said first, second, third pluralities and said master pointer are provided on a large scale integrated circuit fabricated in the form of a complementary metal oxide semiconductor, silicon-on-sapphire chip.

5. The register file unit of claim 1 in combination with at least one additional similar register file unit wherein the master pointer register of one such register file unit is slaved to the master pointer register of the other register unit in response to the detection of nuclear radiation events.

6. The register file unit of claim 1, further comprising:
a further plurality of registers, said fourth plurality having at least one status register for registering the truth state of a status signal for representing the status of an operating parameter of said central processing unit.

7. The register file unit of claim 6, further comprising:
a fifth plurality of registers, said fifth plurality having at least two status save registers corresponding to each status register for communication with the corresponding status register for either storing a status save signal representing the truth state of the corresponding status register or for forcing the truth state of the corresponding status register to a value that corresponds to the truth state of said status save signal.

8. A hard register file unit for use in a general purpose digital computer having a central processing unit and a memory unit, the hardened register file unit providing temporary storage means for sets of data signals for use by the central processing unit in accordance with instruction signals fetched from the memory unit and also providing roll-back points for storing updated sets of data signals that are valid despite the occurrence of a disrupting event that disrupts signals in transit between the register file unit and the other portions of the computer, but which does not disrupt signals already stored in portions of the hard register file unit, the hard register file unit comprising:
a plurality of data registers including at least two data registers for storing each set of data signals in either one of a group of alternate data registers in accordance with the truth state of a corresponding pointer register;
a plurality of pointer registers including at least one pointer register corresponding to each group of alternate data registers, each such pointer register having means for storing a pointer signal for indicating which one data register of a corresponding group of data registers is to be utilized to recover from a disrupting event;
a plurality of pointer save registers including at least two pointer save registers corresponding to each pointer register for communication with the corresponding pointer register for either storing a pointer save signal representing the state of the pointer signal of the corresponding pointer register or for forcing the truth state of the pointer signal of the corresponding pointer register to correspond to said pointer save signal;
a master pointer register having means for storing a pointer selection signal for selecting one of said pointer status registers for communication with the corresponding pointer register; and
means for inverting the truth state of each pointer register and of the master pointer register each time a set of data signals is written into a data register.

9. The hard register file unit of claim 8, further comprising:
a plurality of write control registers including at least one write control register corresponding to each pointer register, each such write control register having means for registering the truth state of a write control signal for selectively inhibiting the inverting of the truth value of the corresponding pointer register signal.

10. The hard register file unit of claim 8, further comprising:
nuclear radiation detection means for generating a signal in response to detection of a nuclear radiation event; and
means coupling said signal generated by said nuclear radiation detecting means to said central processing unit for initiating a recovery operation; and
means responsive to said central processing unit during a recovery operation for employing the most recently establishing circumvention roll-back-point for establishing normal operations in said digital computer subsequent to said recovery operation.

11. The hard register file unit of claim 8 on a large scale integrated circuit generally fabricated in the form of a complementary metal oxide semiconductor, silicon-on-sapphire chip.

12. The hard register file unit of claim 8 in combination with at least one additional similar hard register file unit wherein the master pointer register of one such hard register file unit is slaved to the master pointer register of the other hard register unit in response to the detection of nuclear radiation events.

13. The register file unit of claim 8, further comprising:
a plurality of status registers having at least one status register for registering the truth state of a status signal for representing the status of an operating parameter of said central processing unit.

14. The register file unit of claim 13, further comprising:
a plurality of status save registers having at least two status save registers corresponding to each status register for communication with the corresponding status register for either storing a status save signal representing the truth state of the corresponding status register or for forcing the truth state of the corresponding status register to a value that corresponds to said status save signal.

15. In a central processing unit for use in a general purpose digital computer, the combination comprising a plurality of radiation hard memory storage elements, said storage elements being allocated to provide at least one dual set of data storage elements for alternately storing a data word in one of the two sets of such storage elements, one set of said dual set of data storage elements having a valid data word stored therein, an additional storage element corresponding to said dual set of data word storage elements for use as a pointer indicating which set of data storage elements is a current source of a valid data word, an additional set of dual storage elements corresponding to said dual set of data storage elements for storing save signals representing the truth state of a signal stored in said pointer, still another storage element for storing a master pointer signal, the truth state of which indicates which pointer save signal storage element represents the pointer signal truth state to be used to select the proper set of data storage elements for generating a valid data word, and means for charging the truth state of the signals stored respectively in said pointer storage element and in said master pointer storage element each time a data word is stored in a set of data storage elements.

16. The combination of claim 15, further comprising:
an additional storage element for use as a write control register corresponding to said pointer storage element, said write control register having means for registering the truth state of a write control signal for selectively inhibiting the changing of the truth value of said pointer storage element.

17. The combination of claim 15, further comprising:
nuclear radiation detection means for generating a signal in response to detection of a nuclear radiation event; and
means coupling said signal generated by said nuclear radiation detecting means to said central processing unit for initiating a recovery operation; and
means responsive to said central processing unit during a recovery operation for establishing normal operations in said digital computer subsequent to said recovery operation.

18. The combination of claim 15 wherein all of said storage elements are provided on a large scale integrated circuit generally fabricated in the form of a complementary metal oxide semiconductor, silicon-on-sapphire chip.

19. The combination of claim 15 in combination with at least one additional similar plurality of storage elements wherein the master pointer storage element of one such plurality is slaved to the master pointer storage element of another such plurality in response to the detection of a nuclear radiation event.

20. The combination of claim 15, further comprising:
an additional storage element for registering the truth state of a status signal for representing the status of an operating parameter of said central processing unit.

21. The combination of claim 20, further comprising:
additional storage elements forming at least two status save registers corresponding to each status signal storage element for communication with the corresponding status signal storage element for either storing a status save signal representing the truth state of the corresponding status signal or for forcing the truth state of the corresponding status signal to a value that corresponds to said status save signal.

* * * * *